United States Patent
Olausson et al.

[11] Patent Number: 5,687,230
[45] Date of Patent: Nov. 11, 1997

[54] DEVICE FOR MOBILE TELEPHONES

[75] Inventors: Jan-Olof Olausson; Lars Planefeldt, both of Hönö ; Dan Svensson, Göteborg; Sven Åke Gullner, Västra Frölunda, all of Sweden

[73] Assignee: AB Volvo, Sweden

[21] Appl. No.: 602,843

[22] PCT Filed: Sep. 2, 1994

[86] PCT No.: PCT/SE94/00813

§ 371 Date: Jun. 14, 1996

§ 102(e) Date: Jun. 14, 1996

[87] PCT Pub. No.: WO95/06573

PCT Pub. Date: Mar. 9, 1995

[30] Foreign Application Priority Data

Sep. 3, 1993 [SE] Sweden ............... 9302878

[51] Int. Cl.⁶ ............................................. H04M 1/00
[52] U.S. Cl. ........................ 379/428; 379/430; 379/431
[58] Field of Search ............................. 379/430, 431, 379/449, 420, 428, 447; 381/86, 71; 455/89, 347; D12/416; D14/157, 258; 297/61, 186

[56] References Cited

U.S. PATENT DOCUMENTS

| 4,151,468 | 4/1979 | Kerr ............................. 455/89 |
| 4,490,842 | 12/1984 | Watanabe ....................... 381/86 |
| 5,133,017 | 7/1992 | Cain et al. ..................... 381/71 |
| 5,159,714 | 10/1992 | Cosentino et al. ............. 455/347 |

FOREIGN PATENT DOCUMENTS

| 0368291 | 5/1990 | European Pat. Off. . |
| 467681 | 8/1992 | Sweden . |
| 2253782 | 9/1992 | United Kingdom . |
| WO 93/01951 | 2/1993 | WIPO . |

Primary Examiner—Dwayne Bost
Assistant Examiner—Keith Ferguson
Attorney, Agent, or Firm—Samuels, Gauthier, Stevens & Reppert

[57] ABSTRACT

The invention relates to a device for mobile telephone apparatus comprising at least one loudspeaker and at least one microphone arranged in connection with a headrest, the loudspeaker and the microphone being connected to the mobile telephone. According to the invention, the loudspeaker is integrated in the headrest and the microphone is arranged on an arm, which arm is attached to the headrest.

7 Claims, 4 Drawing Sheets

DEVICE FOR MOBILE TELEPHONES

BACKGROUND OF THE INVENTION

The present invention relates to a device for mobile telephone apparatus, comprising at least one loudspeaker and at least one microphone arranged in connection with a headrest, the loudspeaker and the microphone being connected to the mobile telephone apparatus.

In the field of mobile telephones, there is a demand for allowing the user to use the telephone while at the same time having both hands free, particularly in order to be able to drive the vehicle in a safe manner. This is particularly the case in connection with so called "duplex" transmission, i.e. where signal transmission via the mobile telephone is carried out in two directions simultaneously.

A device which is directed towards this demand is previously known from patent document EP 0368291, which shows a mobile telephone apparatus with a loudspeaker 6 and a microphone 3. The loudspeaker 6 is integrated in the headrest, whereas the microphone 3 may be arranged either on the sun visor or on a flexible arm which is attached under the roof.

Another device of a similar type is known from Swedish patent no. SE 467681, in which an existing headrest may be provided with a separate loudspeaker unit comprising a loudspeaker element and a microphone.

SUMMARY OF THE INVENTION

The object of the present invention is to provide an improved device for use in connection with mobile telephone apparatus, which device allows the user's hands to be free while at the same time providing an easily exchangeable unit which may be arranged on an existing vehicle seat. This is achieved by means of a device of the abovementioned type which is characterized in that the loudspeaker is integrated in the headrest and that the microphone is arranged on an arm, which arm is attached to the headrest.

Accordingly, the present invention provides a device for a mobile telephone apparatus having at least one loudspeaker and at least one microphone arranged in connection with a headrest. The loudspeaker and the microphone are connected to the mobile telephone apparatus. The headrest is adapted to be removably arranged on a vehicle seat. The loudspeaker is integrated within the headrest and the microphone is arranged on an arm which is attached to the headrest.

DETAILED DESCRIPTION OF THE ILLUSTRATED EMBODIMENTS

Figure 1:
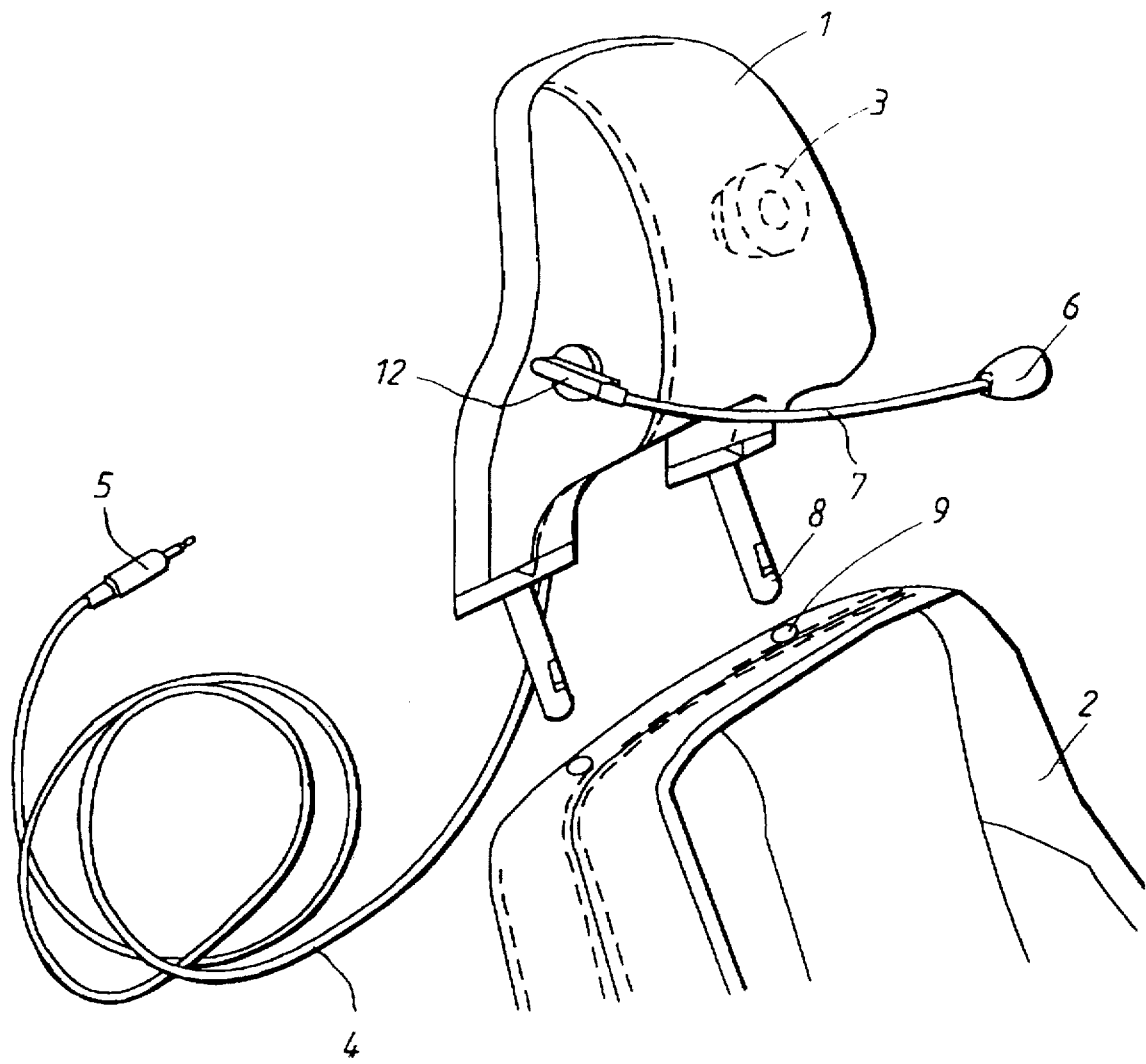
FIG. 1 shows a mobile telephone apparatus in accordance with the present invention.
Figure 2:
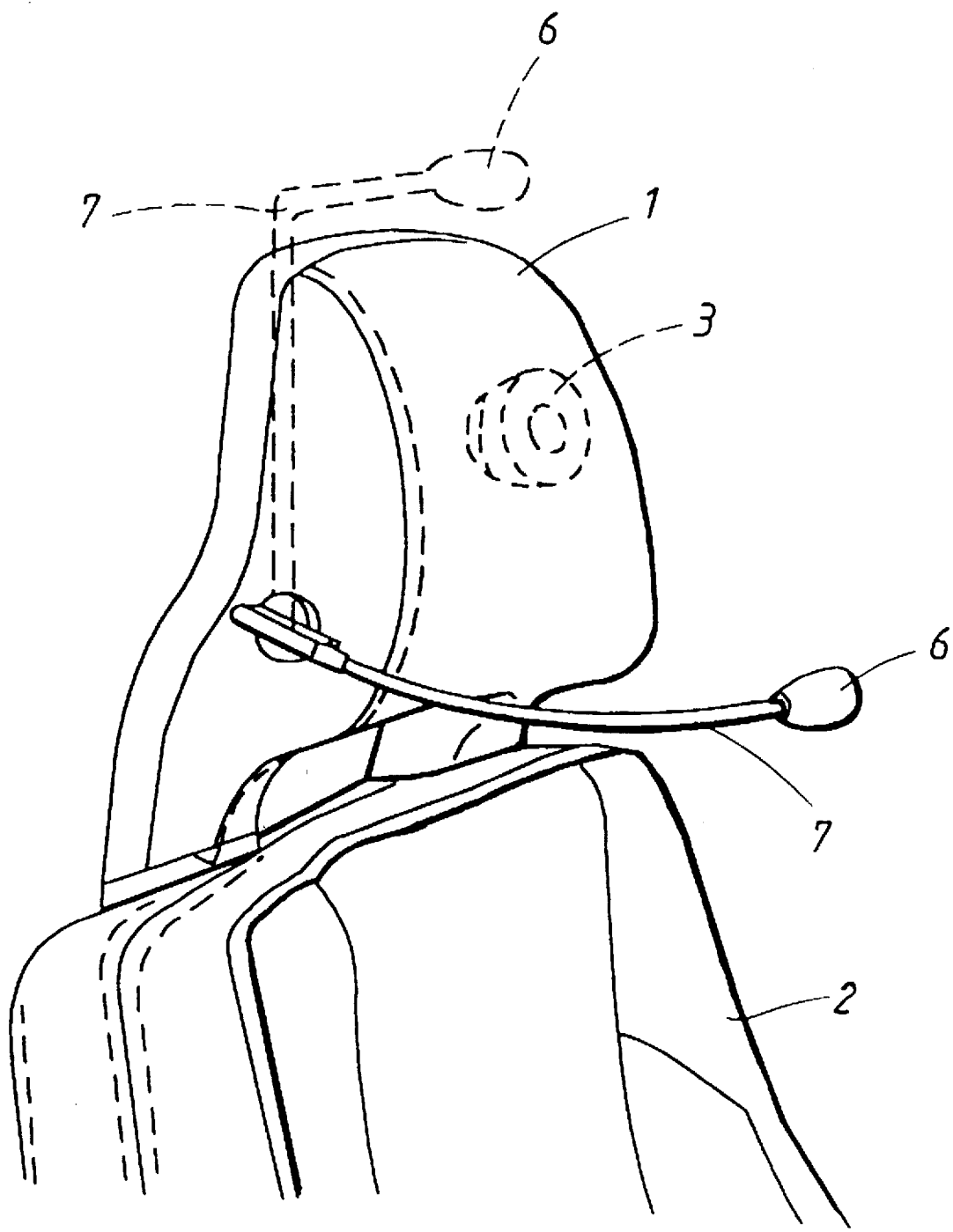
FIG. 2 shows the device in accordance with the invention in an assembled state.
Figure 3:
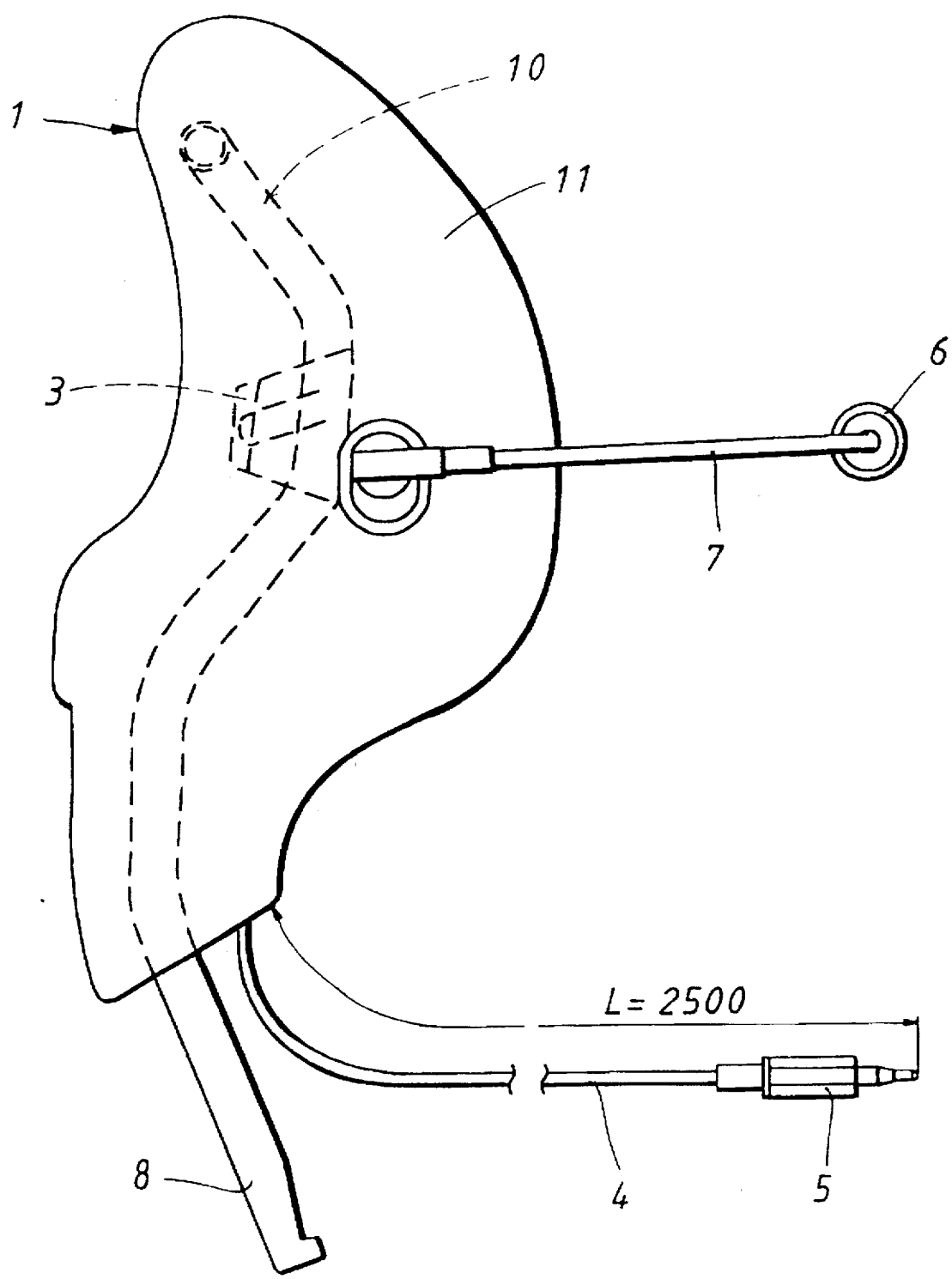
FIG. 3 shows a side view of the present invention with the arm in its lowered position.
Figure 4:
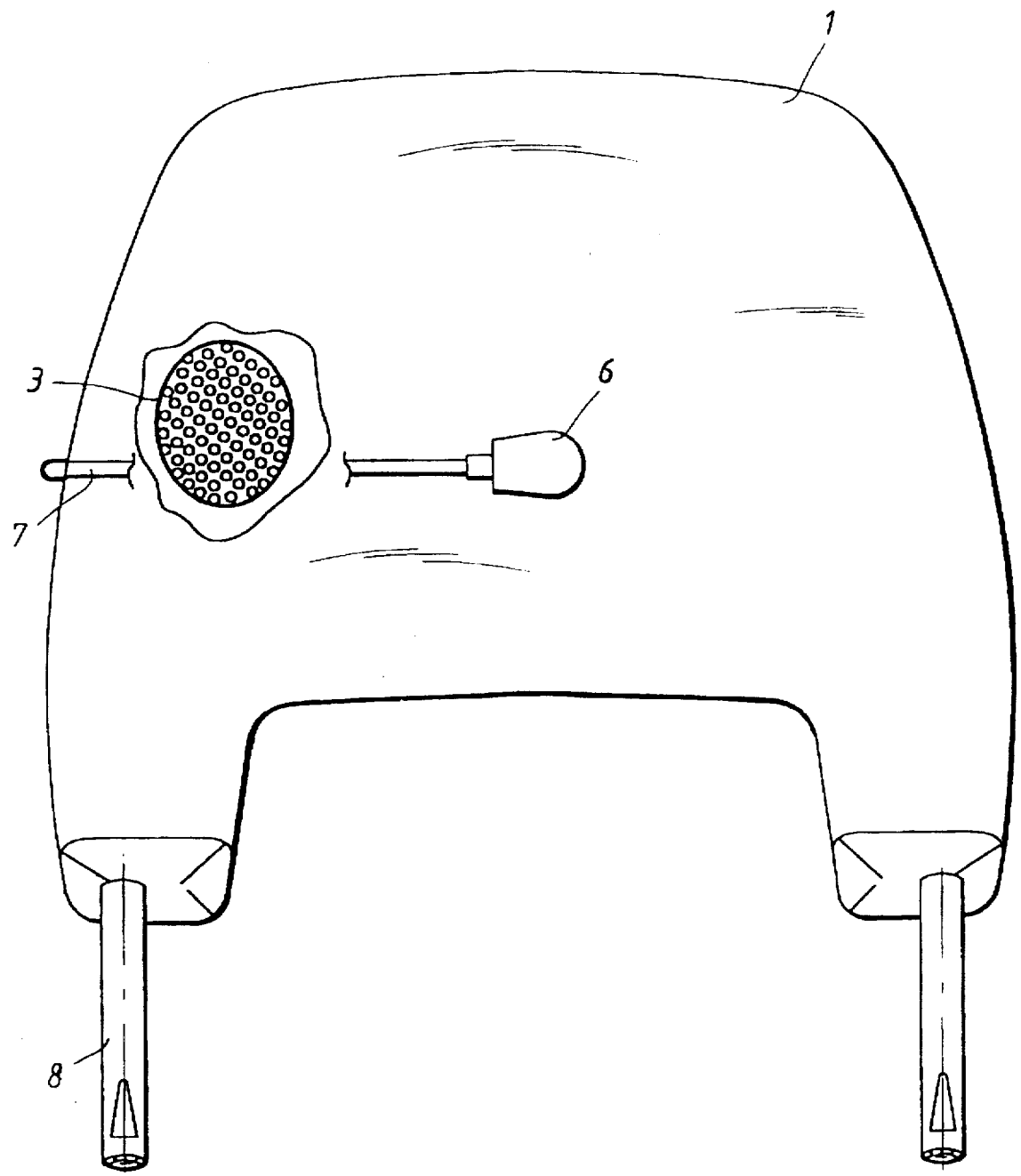
FIG. 4 shows a front view of the present invention.

The invention will now be described in greater detail with reference to the annexed drawings, in which FIG. 1 shows the invention in a dismounted state, FIG. 2 shows the invention mounted on a vehicle seat, FIG. 3 is a side view and FIG. 4 is a front view of the invention.

FIG. 1 shows a preferred embodiment of the invention, which is primarily intended to be used in connection with a mobile telephone apparatus in a vehicle. The invention comprises a removable headrest 1 intended to be mounted on a vehicle seat 2. Inside the headrest 1 there is arranged at least one loudspeaker element 3 which is preferebly placed adjacent to one of the user's ears. Two separate loudspeaker elements may of course be arranged adjacent to the user's respective ear. The loudspeaker element 3 is provided with connections (not shown) which are connected to the wiring 4, which in turn is connected to the fixed part of the mobile telephone apparatus via the connector 5. The fixed part of the mobile telephone apparatus may be arranged on the vehicle's dashboard in a conventional manner.

A microphone 6 is arranged on a flexible arm 7, preferably at its end section. The arm 7 is rotatably mounted on the headrest 1 via a pivotal joint 12, the axis of rotation of which is essentially perpendicular to the longitudinal direction of the vehicle seat (and the headrest 1) and also essentially parallel to the upper side of the headrest 1. In this manner, a displacement of the arm 7 is possible, which displacement is intended to move the microphone 6 between a position in front of the mouth of the user when the telephone is in use and a position above the headrest when the telephone is not in use. The arm 7 is preferably designed so that when turned upwards it is arranged in a position along the contour of the headrest 1, in order to minimize the space requirements. Furthermore, the arm 7 is manufactured from a material of such a nature that it may easily be bent forwards and backwards, for example for allowing the microphone 6 to be arranged in a position in front of the user's mouth which is suitable for speech transmission. The microphone 6 is also provided with a connection for wires (not shown) which run from the microphone 6 to the wiring 4. The wires, by means of which the microphone 6 is connected, are preferably arranged inside the arm 7.

The complete assembly is mounted on the vehicle seat 2 by means of at least one, preferably two, tubes 8 which cooperate with corresponding sockets 9 in the back rest section of the vehicle seat 2.

FIG. 2 shows the device according to the invention in an assembled state. The microphone 6 and the arm 7, respectively, are here shown in their "lowered" position, i.e. with the microphone 6 in front of the user's mouth. In the case where the telephone is not being used, the arm 7 may be swung upwards so that the microphone 6 is positioned above the upper edge of the headrest 1. This "raised" position is indicated by dashed lines in FIG. 2. In this regard, the arm 7 will follow the contour of the headrest 1. The line A indicates the axis of rotation around which the arm 7 and its microphone 6 may be rotated. It should be noted that by means of this raised position, an arrangement of the arm 7 and the microphone 6 is provided which requires a small amount of space in the case where the telephone is not in use.

FIG. 3 shows a side view of the invention, with the arm 7 in its lowered position. The headrest 1 is built around a framework 10, preferably of hard plastic, which is surrounded by a soft filling 11. The loudspeaker 3 is arranged in a recessed manner in the framework 10 so that the front edge of the loudspeaker 3 does not protrude in front of the framework 10. This arrangement minimizes the risk of injuries if the user's head hits the headrest 1, for example in an accident.

FIG. 4 is a front view of the invention, from which the placement of the loudspeaker 3 is apparent. The filling of the headrest 1 is partly removed in front of the loudspeaker 3, so that the sound from the loudspeaker 3 is not attenuated to an unnecessarily high degree.

The invention is especially intended for use in so called full duplex transmission, where there is no need for the user to use any control lever to control when the speech transmission should take place.

A particular advantage is that the entire device, including loudspeaker and microphone, is integrated in the headrest. In this manner, an existing headrest may easily be replaced with a headrest which is prepared for use in connection with mobile telephone apparatus.

According to one possible embodiment of the invention, at least one of the tubes 8 may be provided with connection means (not shown) at its end sections (as a replacement for the wiring 4 and the connector 5), which connection means may be connected for cooperation with corresponding connection means arranged inside the backrest of the vehicle seat 2. In this manner, there is no need for separate wiring which would have had to have been arranged "outside" the vehicle seat, but instead wires for the connection of the microphone 6 and the loudspeaker 3 may be allowed to run inside the tubes 8.

Furthermore, according to a particular embodiment of the invention, the arm 7 may be rotated rearwards and behind the headrest 1 so that the arm 7 and the microphone 6 are placed in a "raised" position behind the headrest 1.

The invention may be used together with previously known systems for active sound reduction according to the principle of phase cancellation, so that the loudspeaker 3 is used for deletion of sound and noise in the passenger compartment of the vehicle. By means of conventional electronics this deletion may be limited to certain frequency ranges so that the transmission of speech signals in connection with mobile telephony is not disturbed. Also the microphone 6 may be integrated in a system for active noise reduction, for recording noise in the vehicle compartment.

According to a further embodiment the arm 6 may control adjustment means, for example for switching on and off the telephone or for adjusting the loudspeaker volume. Such means may be integrated in the pivotal joint 12 and may be influenced by the movements of the arm 6. Thus, the user may control the functions of the telephone by means of head movements.

What is claimed is:

1. A device for mobile telephone apparatus comprising at least one loudspeaker and at least one microphone arranged in connection with a headrest, the loudspeaker and the microphone being connected to the mobile telephone apparatus through an electrical connector associated with said headrest, wherein the headrest is adapted to be removably arranged on a vehicle seat, the loudspeaker is integrated within the headrest and the microphone is arranged on an arm, which arm is attached to the headrest, said loudspeaker and microphone being arranged to accommodate hands-free operation of said mobile telephone apparatus.

2. The device according to claim 1, wherein the arm is pivotally arranged on the headrest to enable a displacement of the arm between a position at the upper side of the headrest and a position in front of the user's mouth.

3. The device according to claim 1, wherein the arm is of a flexible material.

4. The device according to claim 1, wherein the headrest comprises at least one tube, the end section of which is provided with electric connector means for connection of wires to the microphone or the loudspeaker.

5. The device according to claim 4, wherein the tube is essentially shaped as an existing attachment tube for the headrest.

6. A device for use with a communication system, comprising:

a headrest assembly removably mounted on a seat;

an electrical connector associated with said headrest;

a loudspeaker integrated within said headrest; and a microphone arranged on an arm which is coupled to said headrest, wherein said loudspeaker and said microphone are electrically connected to the communication system through said electrical connector, said loudspeaker and said microphone being arranged to allow for hands-free operation of said communication system.

7. A headrest assembly comprising:

a body;

means for removably mounting said body to a seat;

an electrical connector associated with said body;

a loudspeaker integrated within said body; and a microphone arranged on an arm which is coupled to said body, wherein said loudspeaker and said microphone are electrically connected to external devices through said electrical connector, said loudspeaker and said microphone being arranged to allow for hands-free operation of said external devices.

* * * * *